United States Patent
Huang et al.

(10) Patent No.: US 7,706,663 B2
(45) Date of Patent: Apr. 27, 2010

(54) APPARATUS AND METHOD FOR EMBEDDING CONTENT INFORMATION IN A VIDEO BIT STREAM

(75) Inventors: Jau Hsiung Huang, Shindian (TW); Ho Chao Huang, Shindian (TW); Wen Chin Tseng, Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 1597 days.

(21) Appl. No.: 10/963,087

(22) Filed: Oct. 12, 2004

(65) Prior Publication Data

US 2006/0078292 A1 Apr. 13, 2006

(51) Int. Cl.
*H04N 5/76* (2006.01)
(52) U.S. Cl. .................. 386/68; 386/46; 386/111; 386/112; 386/124; 386/125; 386/126

(58) Field of Classification Search ............. 386/46, 386/111–112, 124–126, 68
See application file for complete search history.

(56) References Cited

U.S. PATENT DOCUMENTS

| | | | |
|---|---|---|---|
| 6,493,362 B1 * | 12/2002 | Inazumi | 370/537 |
| 2003/0058939 A1 * | 3/2003 | Lee et al. | 375/240.08 |
| 2005/0084244 A1 * | 4/2005 | Murabayashi | 386/95 |

* cited by examiner

*Primary Examiner*—Thai Tran
*Assistant Examiner*—Helen Shibru
(74) *Attorney, Agent, or Firm*—Thomas, Kayden, Horstemeyer & Risley

(57) ABSTRACT

Systems and methods for deriving content information about a work of multimedia content and embedding the derived content information in a multimedia bitstream to form a hybrid multimedia bitstream are disclosed. The embedded derived content information may be extracted from the multimedia bitstream by an executable module to assist in compressing the performance duration of the multimedia bitstream.

11 Claims, 8 Drawing Sheets

APPARATUS AND METHOD FOR EMBEDDING CONTENT INFORMATION IN A VIDEO BIT STREAM

TECHNICAL FIELD

The present invention relates to systems and methods for processing multimedia and, more specifically, relates to systems and methods for embedding content information in, and extracting content information from, a multimedia bitstream.

BACKGROUND OF THE INVENTION

The need to analyze, edit, and process digital multimedia content, for example, digital audio or digital video, has become a necessity for those who manipulate multimedia content. Processing and editing multimedia content, at one time, was thought of as a task only performed by professional studios. However, advances in computing hardware and the technology used for editing audio and video has opened the door to non-professionals as well.

For example, a home movie may be recorded using a personal camcorder and transferred to a personal computer for processing, editing, or long-term storage. Digital camcorders, for example, record audio, video, and other information related to the home movie in digital form, such as on tape, computer memory, or a mass storage medium. The home movie may then be transferred to a personal computer using any number of interfaces, and then stored as a digital stream such as multimedia file in a number of common formats such as MPEG-1, MPEG-2, or DV, for example.

Due to algorithm complexity and the relatively large amounts of multimedia data that is typically edited and/or processed, the task of analyzing, processing, and editing multimedia content can take a considerable amount of time, even on powerful computers.

One example of processing of multimedia that may be performed is the conversion of a work of multimedia content from one format to another format. Typically, converting a work from one format to another involves a lot of analysis of the content included in the work.

This analysis is typically completed in a vacuum, without the consideration of prior processing or analysis that may have been performed on the multimedia bitstream. Thus, in a subsequent analysis of the multimedia bitstream, the multimedia bitstream is completely re-analyzed without consideration of the prior analysis. Additionally, if the multimedia bitstream is analyzed for other purposes, such as in preparation for temporally modifying the multimedia bitstream, the analysis is performed without regard to the prior analysis. This may be true even though the same type of analysis (e.g. motion detection, etc.) was performed previously when determining the commercial positions.

Additionally, if the multimedia bitstream is passed to another user or analyzed using different software, as is common, the information from any prior analysis is lost. Thus, any analysis of the multimedia bitstream already performed is repeated. This repeated reanalysis of the multimedia bitstream can be very time consuming and wasteful of computing and personnel resources.

SUMMARY OF THE INVENTION

Embodiments of the present invention provide an apparatus and method for automated editing of content. Briefly described, in architecture, one embodiment of the apparatus, among others, can be implemented as follows. The apparatus includes a processor and a content derivation module. The processor implements the content derivation module to embed derived content information into a work, wherein the derived content information includes information for modifying the performance duration of the given work.

Embodiment of the present invention can also be viewed as providing methods for automated editing of content. In this regard, one embodiment of such a method, among others, includes the steps of analyzing at least a portion of a given work to derive content information therefrom. The derived content information includes information for modifying the performance duration of the given work. The method also includes the step of formatting the derived content information into a specific format, and embedding the formatted derived content information into a digital stream that comprises the given work.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Frequently, works of multimedia content are recorded and processed later on. The processing, which can include editing, reformatting, etc., typically, involves an analysis of the content in the work, i.e., deriving content information about the work. The derived content information may have other uses for other post-processing applications such as, but not limited to, temporal compression of the work.

Figure 1:
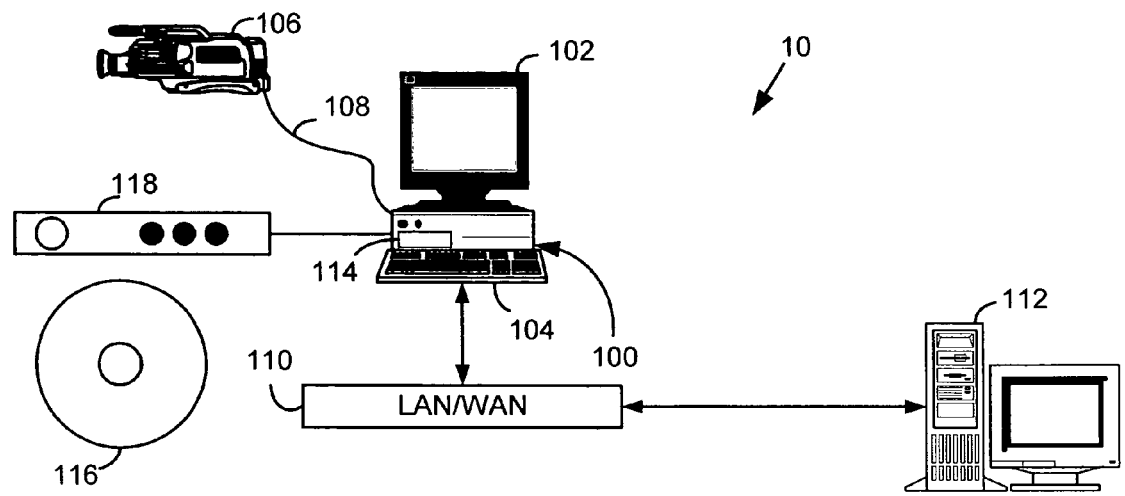
FIG. 1 is a diagram of one embodiment of an automated temporal compression system.

FIG. 1 depicts an overview of an embodiment of an automated temporal compression system (ATCS) 10. Embodiments are described in terms of temporally compressing works of digital multimedia content including video content that conforms to a Motion Pictures Expert Group (MPEG) protocols such as MPEG-1 and MPEG-2, but this is done only for the sake of clarity and is a non-limiting example. The ATCS 10 is intended to temporally compress multimedia digital content regardless of the format of the multimedia digital content.

The automated temporal compression system (ATCS) 10 receives a work of multimedia content and embeds derived content information into the work of multimedia content. The embedded derived content information is then available for any subsequent processing by the ATCS 10 or by other systems and/or video editors. The ATCS 10 is adapted to use the derived content information to play back the work such that the performance duration, i.e., the time span over which the work is played back, is approximately equal to a desired performance parameter, which is specified by a user.

Normally, both recorded and live works of multimedia digital content are played at a constant rate of frames, $v_0$, where $v_0$ is equal to the number of frames played per second at normal/natural playback speed. For the purposes of this disclosure $v_0$ is defined as the natural play rate. Consequently, the natural play time ($T_0$) for a work of multimedia digital content having $N_0$ frames is simply the number of frames ($N_0$) divided by the natural play rate, $T_0=(N_0/v_0)$. When a user wants to play a work of multimedia digital content in a time span that is shorter than $T_0$, the user implements an automated time compression system (ATCS) and inputs a desired performance parameter such as a desired playing duration ($T_D$). The ATCS then plays the work of multimedia digital content at variable play rates, i.e., some frames are played at a play rate of $v_1$ and other frames are played at a play rate of $v_2$, etc. Typically, there are more than two play rates, and sometimes, selected frames of the work of multimedia digital content are dropped and not played at all. Exemplary methods by which the automated time compression system determines play rates and which frames, if any, to dropped are described in detail hereinbelow.

The ATCS 10 includes a computer system 100 having the necessary logic for, among other things, automatically temporally compressing multimedia digital content. The computer system 100 includes a display 102, a user input device such as keyboard 104 and a mouse (not shown). The user of the computer system 100 uses the keyboard and/or mouse and/or other input devices to provide user input such as the desired play duration ($T_D$). The computer system 100 is a standard personal computer having an internal mass storage device (not shown) such as a hard drive and is usually adapted to couple to an external mass storage device (not shown) and/or external input devices (not shown).

In some embodiments, the ATCS 10 includes logic for deriving content information from a given work of multimedia content, and embedding the derived content information into the given work. The ATCS 10 also includes the logic for determining whether a given work has derived content information embedded therein. If the given work includes derived content information, the ATCS 10 is adapted to use the derived content information, if possible, to temporally compress the work by determining variable play rates such that the given work is played back in approximate accordance with a user specified desired performance parameter. In some situations, the derived content information is insufficient for the ATCS 10 to use the embedded derived content information to temporally compress the given work, and in that case, the ATCS 10 analyzes the given work to determine additional derived content information and uses at least a portion of the additional derived content information to temporally compress the given work.

A video camera 106 is coupled to the computer system 100 via an electrical cable 108. The video camera 106 may for example, be a digital camcorder, which records multimedia content in a variety of digital formats. In this embodiment, electrical cable 108 may be any number of common computer interface cables, such as, but not limited to IEEE-1394 High Performance Serial Bus (Firewire), Universal Serial Bus (USB), a serial connection, or a parallel connection. Multimedia digital content is downloaded from the video camera 106 and stored in a mass storage device of the computer system 100. A user of the computer system 100 can then view the stored video content on the display 102.

Computer system 100 may also form a node on a network 110 such as, but not limited to a LAN or a WAN. In this configuration, multimedia bitstreams may be delivered from a remote server 112 over network 110 to computer system 100. The connection between the remote server 112 and computer system 100 may be any number of standard networking interfaces such as a CAT-5, Firewire, or wireless connection. Computer system 100 may also include optical drive 114 to receive and read optical disk 116, which may have multimedia bitstreams encoded thereon.

In some embodiments, a multimedia bitstream may be downloaded to the computer using multimedia input device 118 which may be a break-out box, or could be integrated onto an expansion card, either of which are electrically connected to computer system 100.

In some embodiments, the multimedia input device 118 may include a variety of standard digital or analog input connections for receiving multimedia signals such as, but not limited to, RCA jacks, a microphone jack, Sony/Philips Digital Interface (S/PDIF) connections, optical connections, coaxial cable, and S-video connections. The multimedia-input device 118 may include an analog-to-digital converter for converting analog multimedia to digital multimedia streams. In an embodiment in which a multimedia input device 118 is a break-out box external to the ATCS 10, the box is electrically connected in an number of ways, for example, but not limited to, Firewire, USB, a serial connection, or a parallel connection.

Although ATCS 10 has been depicted as adapted to receive content from a camera 106, server 112, and multimedia input device 118, it should be understood that these are non-limiting examples. In other preferred embodiments, the computer system 100 is adapted to receive content from a wide variety of media including, but not limited to, set-top boxes for a subscriber television system, DVD players, and via the Internet.

Figure 2:
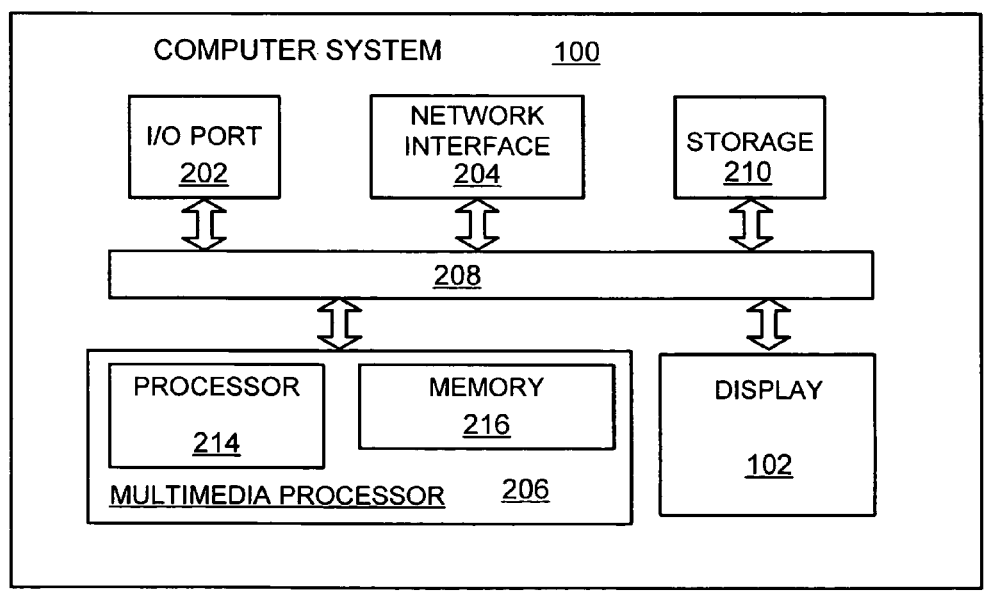
FIG. 2 is a block diagram of selected components of the automated temporal compression system.

Referring to FIG. 2, the computer system 100 includes an input/output port 202, which is adapted to couple with electrical cable 108, and network interface 204, which is adapted to communicate with the network 110. Multimedia content can be received through the I/O port 202 and through the network interface 204. The received multimedia content is provided to a multimedia processor 206 via a bus 208. The I/O port 202 may include a plurality of interfaces such that it can receive (and provide) content from (and to) a plurality of devices in a plurality of formats.

In addition, the connection between the remote server 112 and the ATCS 10 may be any number of standard networking interfaces such as a CAT-5, Firewire, or wireless connection. A network interface comprises various components used to transmit and/or receive data over networks. By way of example, the network interface device 204 may include a device that can communicate with both inputs and outputs, for instance, a modulator/demodulator (e.g., a modem), wireless (e.g., radio frequency (RF)) transceiver, a telephonic interface, a bridge, a router, network card, etc.).

A mass storage device 210 is in communication with the multimedia processor 206 via the bus 208. The mass storage device 210 is adapted to store received works of multimedia content so that the works can be replayed at a later time. In one preferred embodiment, a work of multimedia digital content stored in mass storage device 210 is played back at variable play rates, which are controlled by the multimedia processor 206. The work is provided to the monitor 102. In some embodiments, the work is provided to an external device via network interface 204, and, if necessary, the multimedia processor 206 reformats the work of multimedia content for play on the external device, which might be a device such as a TV (not shown).

The multimedia processor 206 includes a processor 214 and a memory 216. Among other things, the processor 214 implements user commands and modules stored in the memory 216. The memory 216 can include any one of a combination of volatile memory elements (e.g., random-access memory (RAM, such as DRAM, and SRAM, etc.)) and nonvolatile memory elements (e.g., ROM, hard drive, tape, CDROM, etc.).

The multimedia processor 206 is adapted to receive content and then reformat, if necessary, the content to a desired format such as, but not limited to, motion pictures expert group (MPEG), Advanced Visual Interface (AVI), Windows Media Video (WMV), Digital Versatile Disc (DVD), Versatile Compact Disc (VCD), and others known to those skilled in the art. Among other reasons, the multimedia processor 206 reformats works of multimedia content so that the works are in appropriate format for display and so that the works are physically compressed on the mass storage device 210.

Generally speaking, the ATCS 10 can comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, computer system 100 can, for instance, comprise memory, a processing device, a number of input/output interfaces, a network interface device, and mass storage device, wherein each of these devices are connected across a data bus.

A processing device can include any custom made or commercially available processor, a central processing unit (CPU) or an auxiliary processor among several processors associated with the computer system, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

Input/output interfaces provide any number of interfaces for the input and output of data. For example, where the computer system 100 comprises a personal computer, these components may interface with a keyboard or a mouse or other user input device. Where the computer system 100 comprises a handheld device (e.g., PDA, mobile telephone), these components may interface with function keys or buttons, a touch sensitive screen, a stylist, etc. Display 102 can comprise a computer monitor or a plasma screen for a PC or a liquid crystal display (LCD) on a hand held device, for example.

Figure 3:
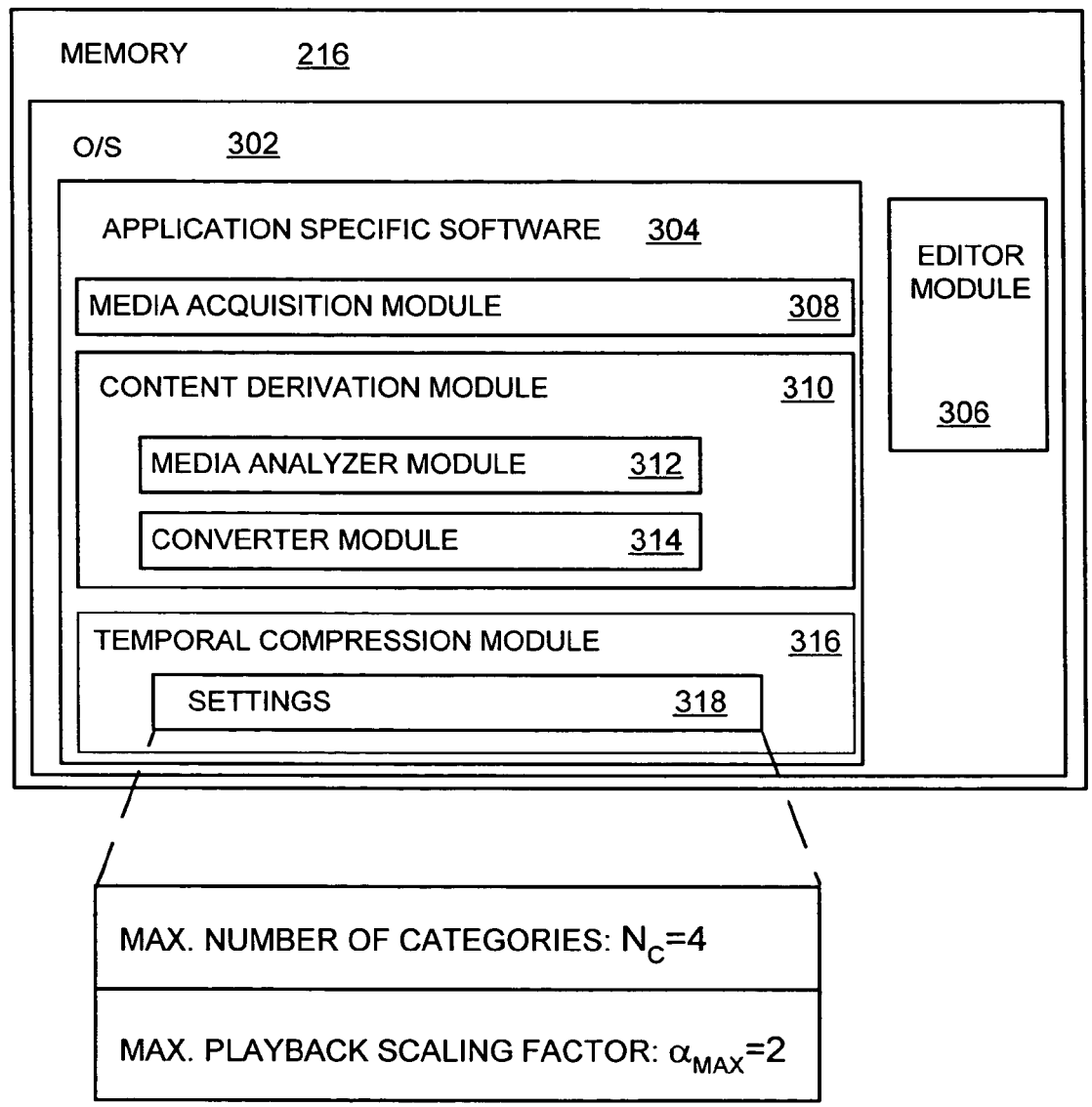
FIG. 3 is a block diagram of memory of the automated temporal compression system.

Referring to FIG. 3, the memory 216 includes a native operating system module 302, an application specific module 304, and an editor module 306. The editor module 306 is implemented by the processor 214 to enable a user of the ATCS 10 to edit a work of multimedia content. The processor 214 implements the O/S 302 to, among other things, provide menu options to the user and interprets user input. In some embodiments, the memory 216 may include one or more native applications, emulation systems, or emulated applications for any of a variety of operating systems and/or emulated hardware platforms, emulated operating systems, etc. One of ordinary skill in the art will appreciate that memory 216 can, and typically will, comprise other components, which have been omitted for purposes of brevity.

The application specific module 304 includes a multimedia acquisition module 308, a content derivation module 310, and a temporal compression module 316. The multimedia acquisition module 308 includes the logic for acquiring a multimedia bitstream in a number of ways, depending on the source. For example, multimedia acquisition module 308 may coordinate the transfer of a multimedia bitstream from the video camera 106, an optical disc 116, the remote server 112, or the mass storage device 210. The multimedia acquisition module 308 also provides the multimedia bitstream to executable modules such as the content derivation module 310 and the temporal compression module 316.

The content derivation module 310 includes a multimedia analyzer module 312 and a converter module 314. Among other things, the content derivation module includes the logic for analyzing content in a work so to derive content information therefrom and logic for embedding derived content information in the work. The content derivation module 310 also includes the logic for determining whether a given work has derived content information embedded therein. The content derivation module 310 also includes logic for determining the extent of the analysis that produced the derived content information that is embedded in a given work. In some situations, the derived content information embedded in a work is generated from a partial analysis of work, and in other situations, the derived content information embedded in the work is generated from a full analysis of the work.

The multimedia analyzer module 312 may be used for detecting scene change positions and values, detecting whether video is interlaced, detecting the level of color saturation in the source video, detecting motion in frames of video, detecting the contrast or brightness level of the source video, or detecting various other characteristics of video or audio within a multimedia bitstream such as, but not limited to, speech, or lack thereof, amount of audio volume, and types of audio (explosions, gun-shots, mechanical sounds such as engines, etc.). In one preferred embodiment, the multimedia analyzer module 312 does not actually modify video and/or audio content, but yet in other embodiments, the multimedia analyzer module 312 does modify video and/or audio content.

In one embodiment, the analyzer module 312 is adapted to determine, among other things, an amount of motion in the data representing video content, the probability of a scene change in a segment of video and the corresponding location in the stream of multimedia data, whether the video is interlaced, whether the video has been previously altered, whether the video includes a video watermark, whether the video has been enhanced, whether the video has been blurred, the color saturation of the source video, the contrast level of source video, the brightness level of source video, the volume level of the source audio, whether the source audio is normalized, the level of hiss in the source audio, whether a video segment includes any face or eyes of a subject, whether there is any human voice in the audio stream, the noise level, the blocky level, the frame complexity, detect skin color, detect animation, object segmentation, viewer focus detect, and frame orientation detect.

The converter module 314 is receives a multimedia bitstream in a given format and using derived content information from the analyzer module 312 converts the received multimedia bitstream into a desired format such as, but not limited to, Motion Pictures Expert Group (MPEG), Advanced Visual Interface (AVI), Windows Media Video (WMV), Digital Versatile Disc (DVD), Versatile Compact Disc (VCD), and others known to those skilled in the art. Typically, received content is reformatted so that it can be physically compressed when stored in the mass storage device 210.

The temporal controller module 316 includes setting 318 and the logic for categorizing segments of video content, for heirarchizing the categories of segments, and for determining variable playback rates. The settings 318 include both default and user defined preferences/settings. An example of a preference includes a maximum playback scaling factor ($\alpha_{MAX}$), where alpha is used to multiply the natural play rate $v_0$. Typically, the default value for alpha is less than 2, but the user may provide his or her own value. Another exemplary preference is number of categories ($N_C$), which is explained in detail hereinbelow.

The temporal compression module 316 is adapted to process multimedia digital content such that when the content is played, the actual play time approximately corresponds to a user-defined desired duration ($T_D$). Typically, the percent difference, which is defined as the difference between the actual play time and the desired duration divided by the desired duration, is approximately in the range of five percent (5%) or less. The temporal compression module 316 uses the settings 318 in temporally compressing the multimedia digital content.

In some embodiments, the application specific software 304 might also include a multimedia processing module (not shown), which includes the logic for performing a number of processing steps to a multimedia bitstream. For example, the multimedia processing module may be used to, among other things, normalize the volume of an audio bitstream, change the contrast or brightness level of a video bitstream, change the color saturation of a video bitstream, speed up or slow down the playback of the bitstream, video deinterlacing, audio virtual surround, audio voice extraction, video object removal, color correction/calibration, color temperature adjustment, watermarking, judder removal, smart cropping, smart scaling/stretching, chroma upsampling, skin tone correction, rotation, or other video processing tasks such as enhancing or blurring the video content. In one embodiment, the multimedia processing module is adapted to determine, among other things, an amount of motion in the data representing video content, the probability of a scene change in a segment of video and the corresponding location in the stream of multimedia data, whether the video is interlaced, whether the video has been previously altered, whether the video includes a video watermark, whether the video has been enhanced, whether the video has been blurred, the color saturation of the source video, the contrast level of source video, the brightness level of source video, the volume level of the source audio, whether the source audio is normalized, the level of hiss in the source audio, whether a video segment includes any face or eyes of a subject, whether there is any human voice in the audio stream, the noise level, the blocky level, the frame complexity, detect skin color, detect animation, object segmentation, viewer focus detect, and frame orientation detect. In one preferred embodiment, the multimedia processing module may change the bitstream that it is processing.

Note that in some embodiments, multimedia acquisition module 308, content derivation module 310, and the temporal compression module 316 may be combined into a single module that performs any combination of the tasks performed by each of the modules separately. Thus, any modules or submodules described herein are not limited to existing as separate modules. In reality all modules may operate apart from one another, or could easily be combined as one module.

In some embodiments, a user may interact and control the operation of the editor module 306, and the application specific software 304 including the multimedia acquisition module 308, content derivation module 310, and the temporal compression module 316 through the user input device 104 and a graphical user interface within the display 102.

Each of the multimedia acquisition module 308, content derivation module 310, and the temporal compression module 316, and any sub-modules, may comprise an ordered listing of executable instructions for implementing logical functions. When the multimedia acquisition module 308, content derivation module 310, and the temporal compression module 316, and any sub-modules are implemented in software, it should be noted that the software can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The multimedia acquisition module 308, content derivation module 310, and the temporal compression module 316, and any sub-modules can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store the program for use by or in connection with the instruction execution system, apparatus, or device. The computer readable medium can be, for example but not limited to, an electronic, magnetic, optical, electromagnetic, infrared, or semiconductor system, apparatus, device, or medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (COROM) (optical).

A multimedia bitstream may be, for example, any type of file, data stream, or digital broadcast representing any combination of audio, video, data, text, pictures, etc. For example, multimedia streams may take the format of an MPEG-1 bitstream, an MPEG-2 bitstream, an MPEG-4 bitstream, an H.264 bitstream, a 3GPP bitstream, an AVI bitstream, a WAV bitstream, a digital video (DV) bitstream, a QuickTime (QT)

file, a Compact Disc Audio (CDA) bitstream, an MPEG Audio Layer III (MP3) bitstream, an MPEG Audio Layer II (MP2) bitstream Windows Media Audio (WMA) bitstream, Windows Media Video (WMV) bitstream, Advanced System Format (ASF) bitstream, or any number of other popular digital multimedia formats. The above exemplary data streams are merely examples, and it is intended that the system cover any type of multimedia bitstream in its broadest sense.

Figure 4A:
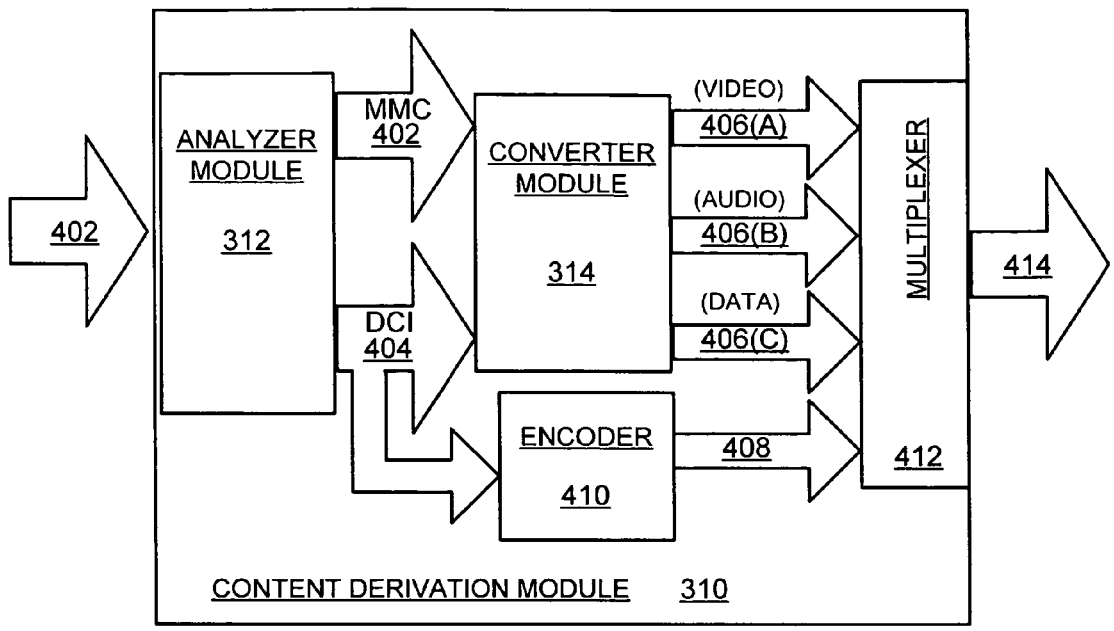
FIG. 4A depicts a block diagram of an embodiment of a system for embedding derived content information within a multimedia bitstream.

FIG. 4A depicts an embodiment for processing a multimedia content stream 402. In this embodiment, the content derivation module 310 includes an encoder 410 and a multiplexer 412. The analyzer module 312 receives the multimedia content stream 402 and outputs the multimedia content stream 402 to the converter module 314. The information that the analyzer module 312 derives about the multimedia content stream 402 is outputted as derived content information (DCI) 404, which is provided to the converter 314 and to the encoder 410. Among other things, the derived content information 404 associates content information derived by the multimedia analyzer module 312 with the frames of multimedia having specific properties. Examples of quantities included in the derived content information includes, but are not limited to, scene change positions and values, whether video is interlaced, level of color saturation in the source video, contrast or brightness level of the source video, motion in frames of video, or other characteristics of video or audio within a multimedia bitstream such as, but not limited to, speech, or lack thereof, amount of audio volume, and types of audio (explosions, gun-shots, mechanical sounds such as engines, etc.).

The converter module 314 receives the multimedia content stream 402 and the derived content information 404 and outputs a plurality of digital elementary streams 406(A)-406(C). The digital elementary streams include a video stream 406(A), an audio stream 406(B), and a data stream 406(C). Those skilled in the art recognize that elementary streams 406(A)-406(C) are exemplary streams and that more or fewer elementary streams may be outputted by the converter module 314.

The converter module 314 receives the multimedia content stream 402 and, if necessary, reformats/converts the content included therein into a digital format such as MPEG or other desired formats. The converter module 314 uses the information included in the derived content information 404 to facilitate the conversion of the multimedia content stream 402 from one format to another. In some situations, the multimedia content stream 402 is already in a desired format such that reformatting is unnecessary or not desired. For example, in some situations, the multimedia content stream (i.e., input stream) 402 is a video only bitstream that does not need to be reformatted; and in that case, the output of the converter module 314 is the elementary stream 406(A), which has the same format as the input stream. Sometimes, the multimedia content stream 402 is in a packet format and reformatting is unnecessary, and in that case, the converter 314 includes a demultiplexer (not shown) that demultiplexes the multimedia content stream 402 into its constituent elementary streams 406(A) 406(C).

The encoder 410 receives derived content information 404 and transforms the derived content information 404 into formatted derived content information 408. The formatted derived content information 408 conforms to the format of the elementary streams 406(A)-406(C). The multiplexer 412 receives the elementary streams 406(A)-406(C) and the formatted derived content information 408. The multiplexer 412 multiplexes the various input streams into a single hybrid multimedia content stream 414. Normally, the hybrid multimedia content stream 414 is then stored in the mass storage device 210 or in another storage device.

Figure 4B:
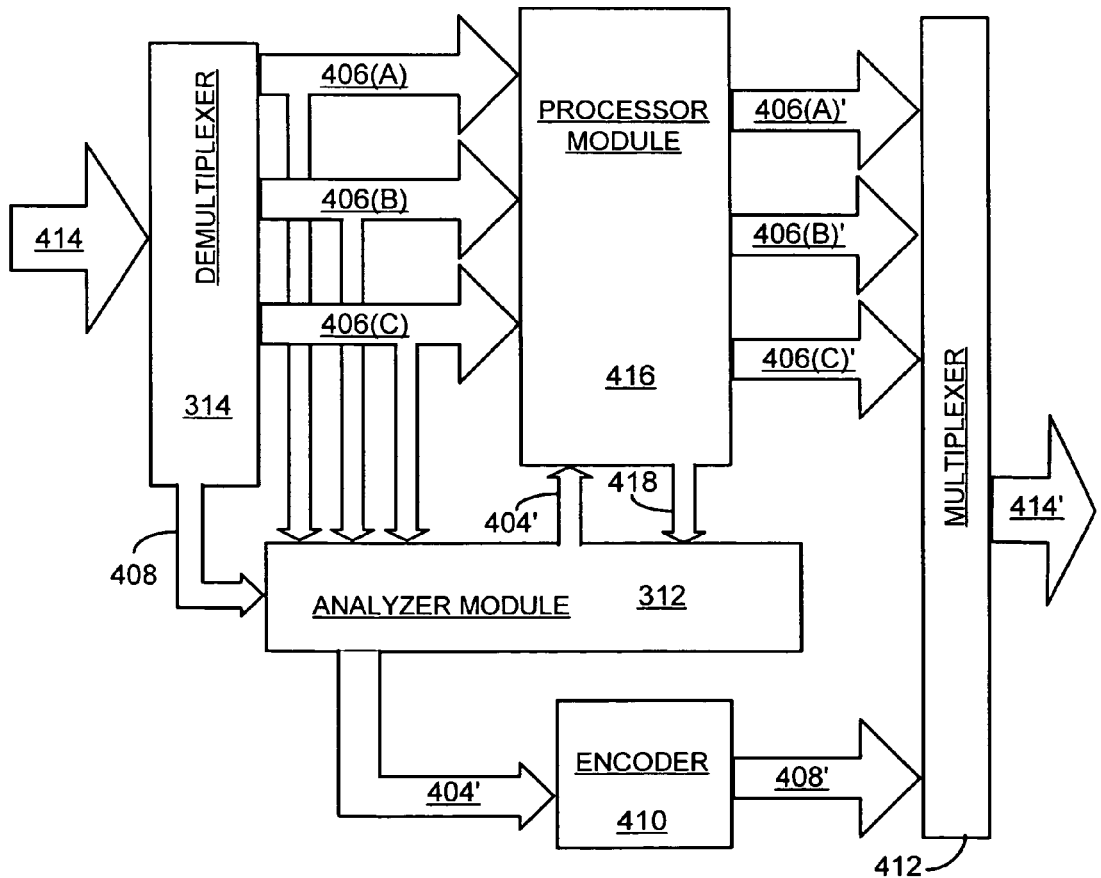
FIG. 4B depicts a block diagram of an embodiment of a system for extracting the derived content information from within a multimedia bitstream.

FIG. 4B depicts an embodiment for processing the hybrid multimedia content stream 414. The converter module 314, which includes a demultiplexer, receives the hybrid multimedia content stream 414 and outputs the constituent elementary streams 406(A)-406(C) and 408. The output elementary streams 406(A)-406(C) are provided to the analyzer module 312 and to a processing module 416. The formatted derived content information 408 is provided to the analyzer module 312.

The analyzer module 312 works in conjunction with the processing module 416 and provides the processing module with derived content information 404'. The derived content information 404' may include the same information of the formatted derived content information 408 or it may include further information. In some situations, the formatted derived content information 408 corresponds to a partial analysis of the multimedia content stream 402, and in that case, the derived content information 404' might correspond to a full analysis of elementary streams 406(A)-406(C) or another partial analysis or no further analysis of elementary streams 406(A)-406(C). The analyzer module 312 also provides the derived content information 404' to the encoder 410, which then outputs formatted derived content information 408', which may or may not be the same as formatted derived content information 408. It should be recognized that the analyzer module 312 uses the formatted derived content information 408 when performing further analysis of the elementary streams 406(A)-406(C).

The processing module 416 receives the elementary streams 406(A)-406(C) and the derived content information 404'. The processing module 416 then processes the elementary streams to generate output elementary streams 406(A)'-406(C)'. The output elementary streams 406(A)'-406(C)' may or may not be the same as the input elementary streams 406(A)-406(C). For example, the processing module 416 might include the editor module 306, and the editor module 306 might edit/change one or more of the elementary streams 406(A)-406(C).

The processing module 416 provides the analyzer module 312 with modified derived content information 418. The modified derived content information 418 represents modifications/edits/changes to the elementary streams 406(A)-406(C). For example, if elementary streams 406(A)-406(C) contain information that is not included in the elementary streams 406(A)'-406(C)', then the modified derived content information 418 indicates this change. The analyzer module 312 uses the modified derived content information 418 in making the derived content information 404'.

In one embodiment, the elementary streams 406(A)'-406(C)' and the formatted derived content information 408' are provided to the multiplexer 412, which then combines them into a single hybrid multimedia content stream 414'. The hybrid multimedia content stream 414' may then be stored in a mass storage device such as device 210 or used in some other fashion.

In one preferred embodiment, the processing module 416 includes the temporal compression module 316. The temporal compression module 316 receives the elementary streams 406(A)-406(C) of a given work of multimedia content and the derived content information 404' for the given work and temporally compresses the performance duration for the given work. An exemplary method for temporally compressing a work of multimedia content is provided hereinbelow.

Figure 5:
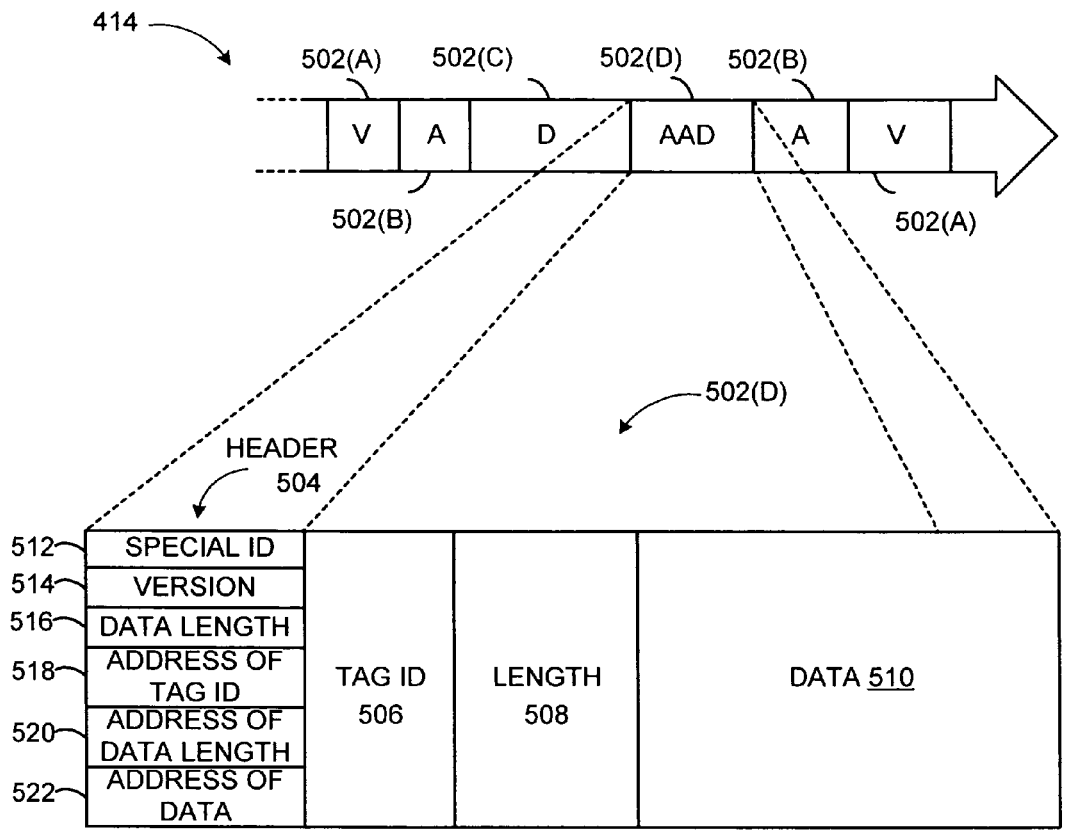
FIG. 5 is a block diagram of a multimedia bitstream having derived content information embedded therein.

FIG. 5 is a block diagram that depicts a portion of the hybrid multimedia content stream 414, which comprises a plurality of packets, or data blocks 502(A)-502(D). Together the packets 502(A) carry the video elementary stream 406 (A); together the packets 502(B) carry the audio elementary stream 406(B); together the packets 502(C) carry the data elementary stream 406(C); and together the packets 502(D) carry the formatted derived content information 408.

FIG. 5 also depicts an exemplary exploded view of an exemplary packetized formatted derived content information, or data block, 502(D) which may be embedded within the hybrid multimedia content stream 414. Packetized formatted derived content information 502(D) may include fields, such as, but not limited to, a Header Field 504, a Tag ID field 506, a Length Field 508, and a Data Field 510. Packetized formatted derived content information 502(D) may be further encapsulated within a transport packet of a particular multimedia format. For example, packetized formatted derived content information 502(D) may be encapsulated within a packetized elementary stream (PES) packet, as defined by the MPEG-2 standard.

Header field 504 may include subfields useful for decoding and extracting the information from packetized formatted derived content information 502(D). Subfields may include, but are not limited to, the Special ID Subfield 512, Version Subfield 514, Length of the Data Subfield 516, Address of Tag ID Subfield 518, Address of Length Subfield 520, and Address of Data Subfield 522. The information in Header Field 504 may vary by application and the fields described herein are merely examples of one possible format.

The Special ID Subfield 512 may refer to identifying information that a decoder may use to identify packetized formatted derived content information 502(D) as a block containing analyzed attribute data, rather than other types of data which may be stored within a particular data stream, for example, title information. Version Subfield 514 may include information which a decoder could use to determine the format version of the data encapsulated in packetized formatted derived content information 502(D). The Length of the Data Subfield 516 indicates the total length of Data Field 510. For example, the Length of Data Subfield 516 may indicate that Data Field 510 has a total length of 5164 bytes. The Address of Tag ID Subfield 518 indicates the position in data block 502(D) where the Tag ID field 506 is located. The Address of Data Length Subfield 520 indicates the position in the data block 502(D) where the Length Field 508 is located. The Address of Data Subfield 522 indicates the position in the data block where the Data Field 510 is located. For example, each of the Address of Tag ID Subfield 518, Address of Data Length Subfield 520, and the Address of Data Subfield 522 may contain a hexadecimal number referencing a specific memory location, or an offset from a predetermined memory location.

Tag ID Field 506 may identify an identifying tag for a number of derived content properties. For example, Tag ID Field 506 may contain data identifying a "scene change" as equivalent to "tag 1," "motion" as equivalent to "tag 2," and "contrast" as equivalent to "tag 3." The derived content properties and their identifying tags are not limited to those described above and will vary and may be arranged in any particular order. The derived content properties and their identifying tags may, for example, be any series of numbers or letters that can be decoded to identify the derived content information in Data Field 510.

Data Field 510 may contain the derived content information and an associated tag for each derived content property defined in the "Tag ID" field. For example, in the exemplary embodiment, derived content information corresponding to "motion" may be found by searching sequentially, or otherwise, for the associated "tag 2" within the Data Field 510.

In one embodiment, to assist in searching for a particular tag, and its associated data within Data Field 510, packetized formatted derived content information 502(D) may also include a Length of Data Field 508 which contains the length (e.g. the number of bits) of each individual derived content information associated with a particular tag within Data Field 510.

Figure 6:
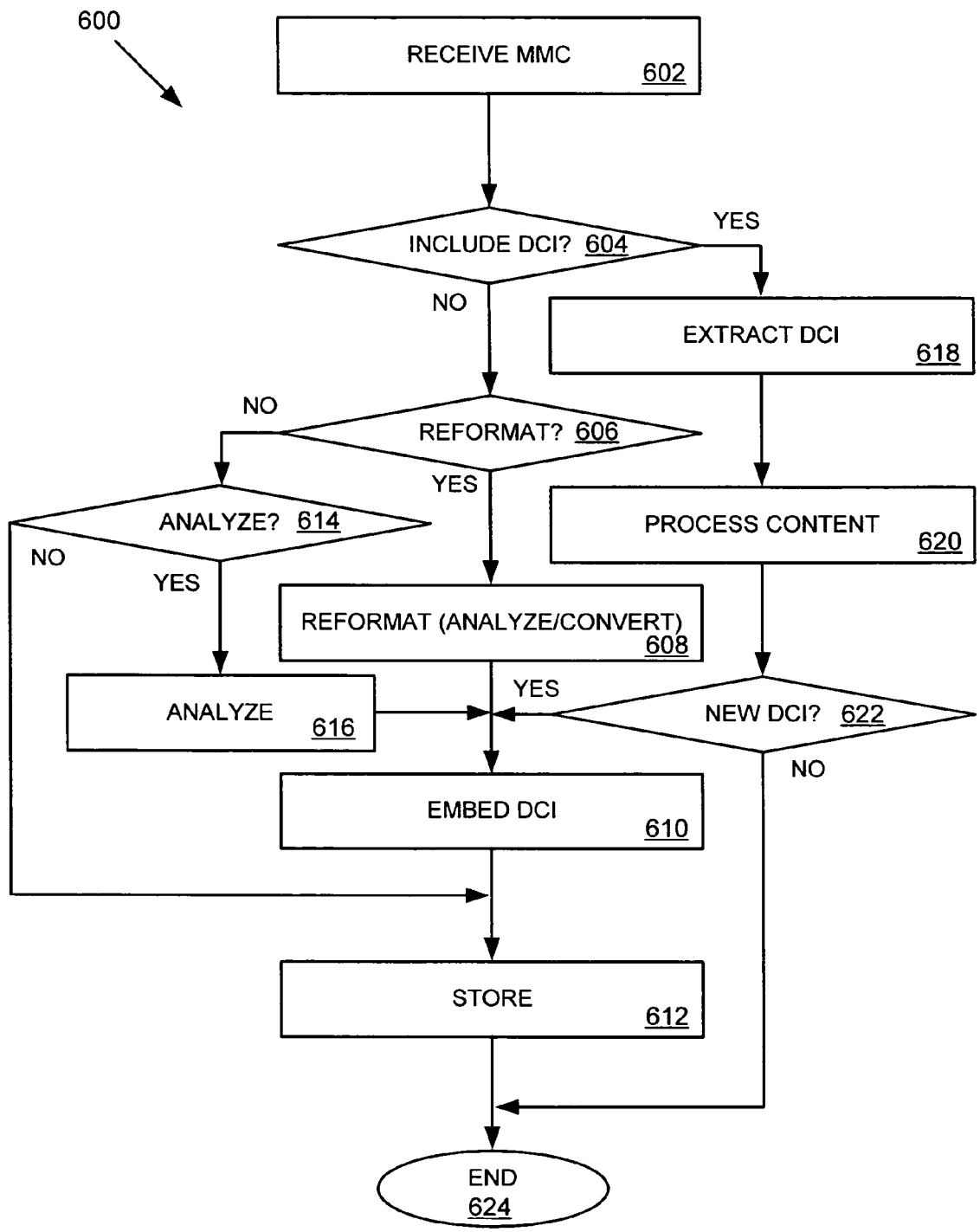
FIG. 6 is a flow chart of steps for processing a work of multimedia content.

FIG. 6 is an exemplary flow diagram 600 depicting a method for embedding derived content information into a work of digital multimedia content. In step 602, a work of multimedia content is received. The work can be a work that is currently stored in the mass storage device 210 or a work that the ATCS 10 is currently receiving.

In step 604, a determination is made whether the work includes derived content information. If the condition of step 604 is negative, then the process continues at step 606. On the other hand, if the condition is positive, i.e., the work includes derived content information, then the process proceeds to step 618.

In step 606, a determination is made whether to reformat the work from its current format to a desired format. Responsive to determining to reformat the work, the process continues at step 608, where reformatting of the work is performed. Reformatting a work involves the implementation of the analyzer module 312 and the converter module 314. In step 608, derived content information is determined about the work.

In step 610, the derived content information is embedded into the reformatted work. The embedded derived content information is formatted such that it corresponds to whatever is the desired format for the reformatted work.

In step 612, the reformatted work having derived content information embedded therein is stored in a device such as the mass storage device 210. The embedded derived content information is included within the work and is available to facilitate future processing. It should be realized that in some embodiments instead of storing the multimedia content, or before storing the content, further processing and/or viewing and/or displaying could be performed on the multimedia content.

Referring back to step 606, if the condition is negative, i.e., no reformatting is desired, which can occur when the received multimedia content is already in a desired format, the procedure continues at step 614. In step 614, a decision on whether to analyze the work is made. If the decision is negative, then the process continues at step 612, and the work is stored for future use and/or analysis. The work could also be used, processed, or displayed before storing it if so desired.

On the other hand, if the condition of step 614 had been positive, then in step 616 the work is analyzed. The derived content information determined by the analysis is embedded within the work in step 610.

Referring back to step 604, if the condition is positive, then the process proceeds to step 618, where embedded derived content information is extracted from the work.

Next, in step 620, the work is processed using at least the derived content information. Non-limiting examples of processing of content performed in step 620 include temporal compression of the work and editing.

Next, on step 622, a determination is made whether the processing has produced new derived content information, and if so, the process proceeds to step 610. If on the other hand, the derived content information is not new, then the process continues at step 624.

Figure 7:
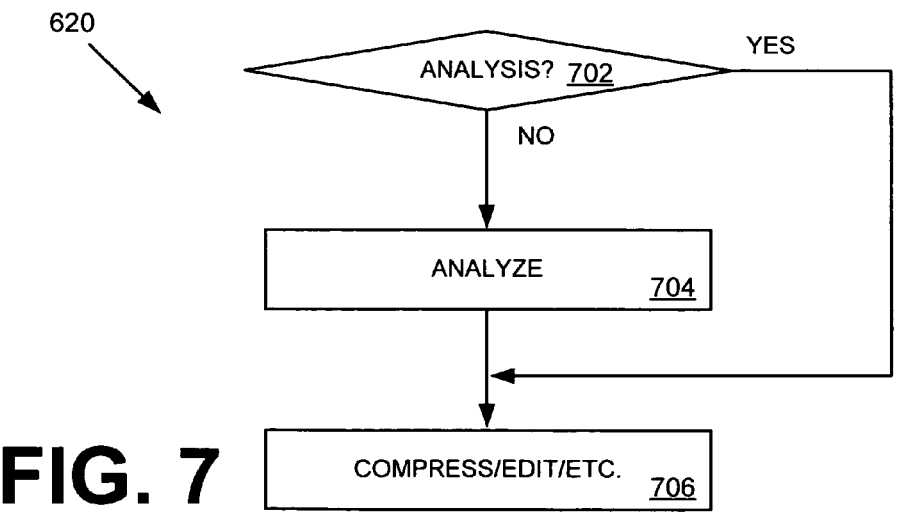
FIG. 7 is a flow chart of steps for processing a work of multimedia content.

FIG. 7 is an exemplary flow diagram depicting steps implemented in step 620. In step 702, a determination is made regarding whether the previous analysis that produced the embedded drive content information was a sufficient analysis.

Sometimes, a partial analysis may have been previously performed. For example, when multimedia content is received, a partial analysis sufficient for format conversion may be performed, and, in that case, the derived content information produced will be from a partial analysis.

If the condition is negative, then the process proceeds to step 704, and another (fuller) analysis is performed, thereby generating new derived content information.

Next, in step 706 the work is temporarily compressed, edited or in some other manner processed. If the condition of step 702 is positive, then the process continues at step 706. It should be noted that in some embodiments, the decision of block 702 can be based upon the type of processing involved in step 706. For example, if the processing is temporal compression and the derived content information is from a partial analysis, the derived content information could be sufficient such that a full and/or another analysis does not need to be performed in step 704. Similarly, the amount of analysis, i.e., full or another partial analysis, of step 704 could also depend upon the processing of step 706.

In addition, in some embodiments, information from step 706 is fed back into the analysis step 704 such that new derived content information corresponding to the processing of step 706 is generated.

In some embodiments, step 620 might include more or fewer or steps that are different from those illustrated in FIG. 7. For example, the work, which includes derived content information, might be reformatted, and, in that case, new derived content information might also be determined during the reformatting of the work.

Figure 8A:
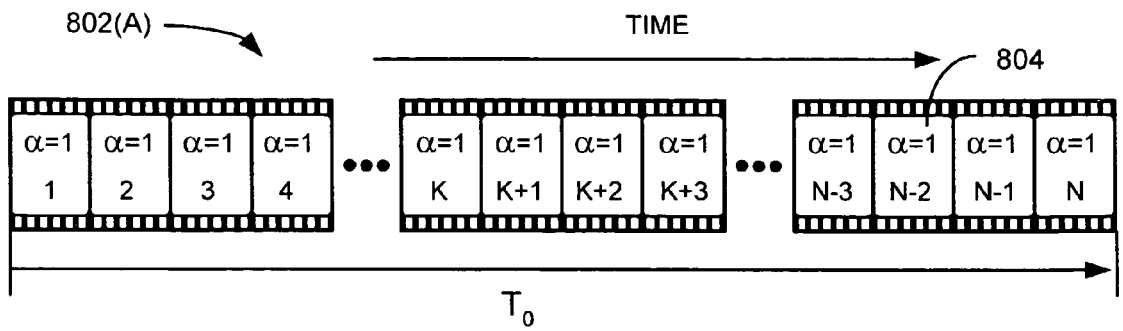
FIG. 8A illustrates the performance duration of a given work of multimedia content.
Figure 8B:
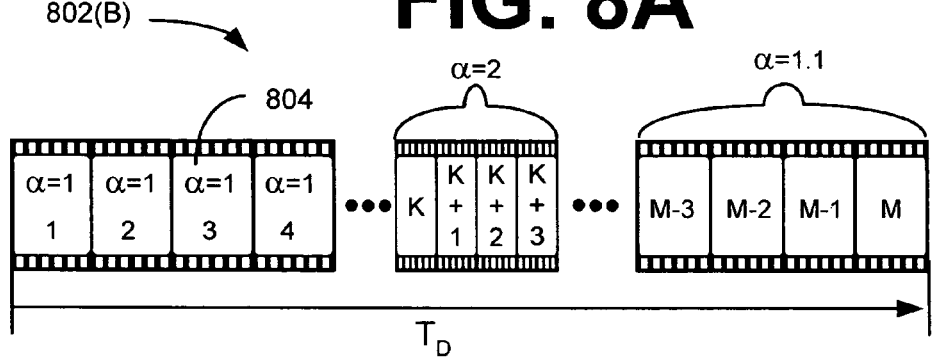
FIG. 8B illustrates the performance duration of the temporally compressed given work.

Referring to FIGS. 8A and 8B, FIG. 8A illustrates a work of multimedia content 802(A), which is made up of N frames 804, being played at its natural playback rate ($v_0$). The natural performance duration for the work of multimedia content 802(A) is $T_0$, where $T_0=(N/v_0)$. FIG. 8B illustrates the performance duration of a work of multimedia content 802(B), which is normally substantially identical to, or is identical to, the work of multimedia content 802(A) and which has a play time of approximately $T_D$, where $T_D$ is less than $T_0$. The works of multimedia content 802(A) and 802(B) may or may not be identical. The play time $T_D$ is less than $T_0$ for at least one of the following reasons:

(1) The work of multimedia digital content 802(B) is made up of M frames of information: $M=N-N_D$, where $N_D$ is the number of frames dropped from the multimedia digital content 802(A). Generally, the individual frames that make-up the work of multimedia digital content 802(B) are identical to their corresponding frame in the work of multimedia digital content 802(A). For example, the first four frames of the works of multimedia digital content 802(A) and 802(B), which are numbered 1-4, are identical. The set of frames in the work of multimedia digital content 802(A) that are numbered N−3, N−2, N−1, and N are identical to the set of frames in the work of multimedia digital content 802(B) that are numbered M−3, M−2, M−1, and M.

(2) The play rate for a segment of frames is faster than the natural play rate $v_0$. For example, the play rate $v$ of the segment of the frames that are numbered K, K+1, K+2, and K+3 in the work of multimedia digital content 802(B) is twice the natural play rate $v_0$, i.e., $v=\alpha v_0$, where $\alpha=2$. (The frames that are numbered K, K+1, K+2, and K+3 in the work of multimedia digital content 802(B) are identical to the same numbered frames in the work of multimedia digital content 802(A).

The work of multimedia digital content 802(B) is produced by the processor 214 implementing the application specific software 304 on the work of multimedia digital content 802(A).

Figure 9:
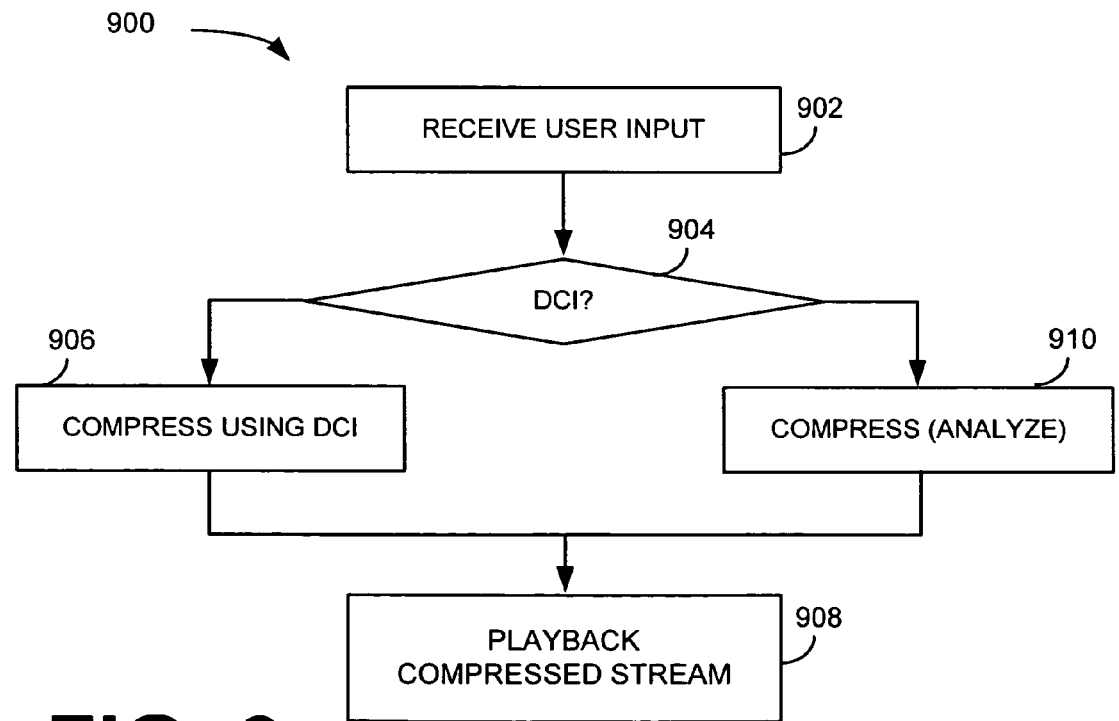
FIG. 9 is depicts a method of providing a work of multimedia content.

The application specific software 304 includes the logic necessary for implementing steps 900 illustrated in FIG. 9, which are exemplary steps for automatically temporally compressing video content. The automatic temporal compression can be for a work of multimedia content that has been previously processed such that it has derived content information embedded therein or for a work that does not include derived content information.

In step 902, the user provides user input such as, but not limited to, selecting a work of video content for temporal compression and the desired performance parameter e.g., the desired playing duration ($T_D$) or desired average playback rate ($\bar{v}_A$) for the selected work. In some alternative embodiments, the user can also input user preferences, which may be stored with and/or used with the settings 318. User preferences include, but are not limited to, the number of categories ($N_C$), maximum scaling factor ($\alpha_{MAX}$), and other parameters. The work of multimedia content selected by the user can be content that is currently stored in the mass storage device 210 or it can be content that is currently being received by the ATCS 10.

In step 904, a determination is made regarding whether the selected work of multimedia content includes derived content information, and if so, whether the derived content information is sufficient for temporally compressing the work. If the condition is met, i.e., the work includes derived content information that is sufficient for temporally compressing the work, then the process continues at step 906, otherwise, the process continues at step 910. In step 906, the work is temporally compressed using the derived content information. On the other hand, if the work did not include sufficient derived content information, then, in step 910, the work is temporally compressed. It should be noted that temporally compressing the work involves analysis of the work. In some embodiments, derived content information that is produced as a result of the analysis is then embedded within the work and the work is then saved to a device such as mass storage device 210.

In step 908, the temporally compressed work of multimedia content is played to the user. The actual play back duration of the temporally compressed video is approximately equal to the desired performance duration ($T_D$).

In one embodiment, in step 902, the user provides a desired average playback rate, $\bar{v}_D$, instead of providing a desired performance duration ($T_D$). In this embodiment, in step 908, the actual average playback rate, $\bar{v}_A$, of the temporally compressed video is approximately equal to the desired average playback rate, $\bar{v}_D$.

Figure 10A:
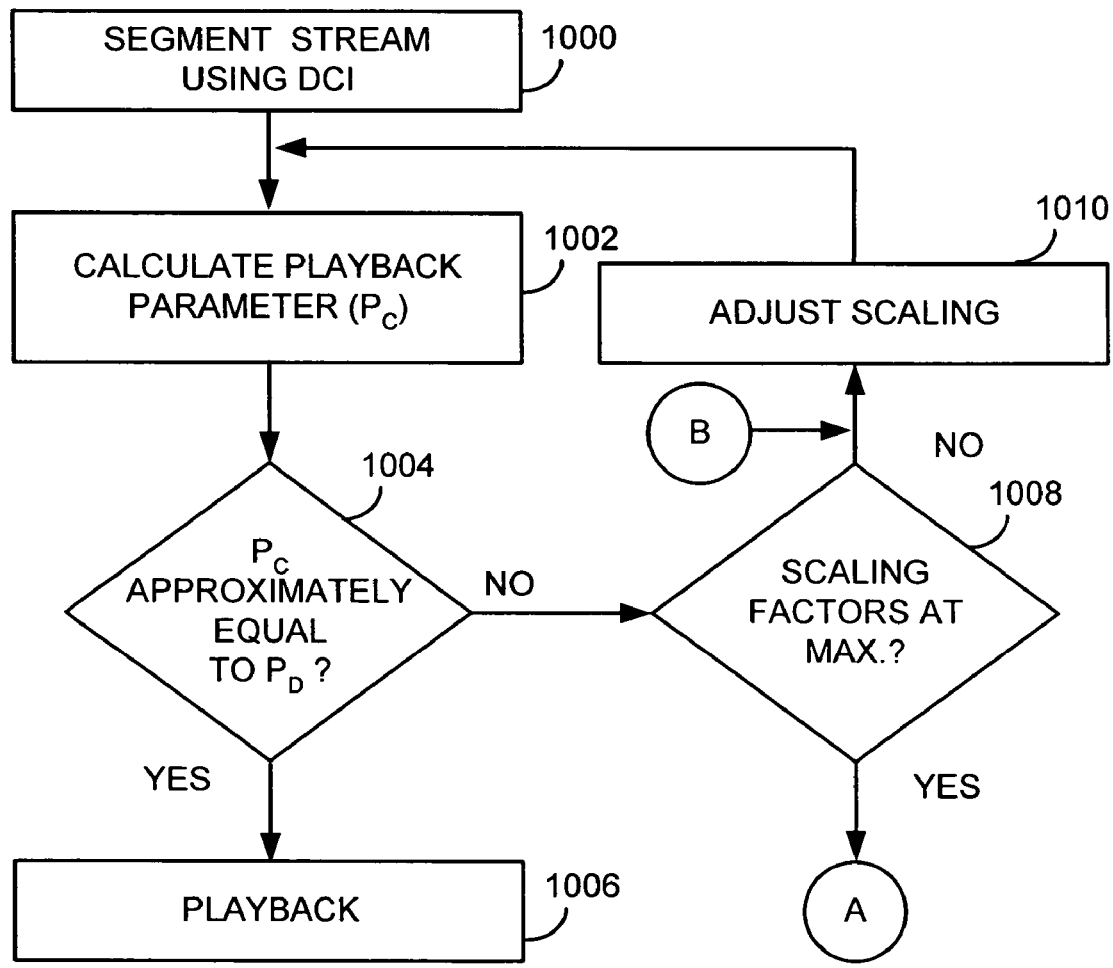
FIG. 10A and FIG. 10B depict a method of temporally compressing a work of multimedia content.
Figure 10B:
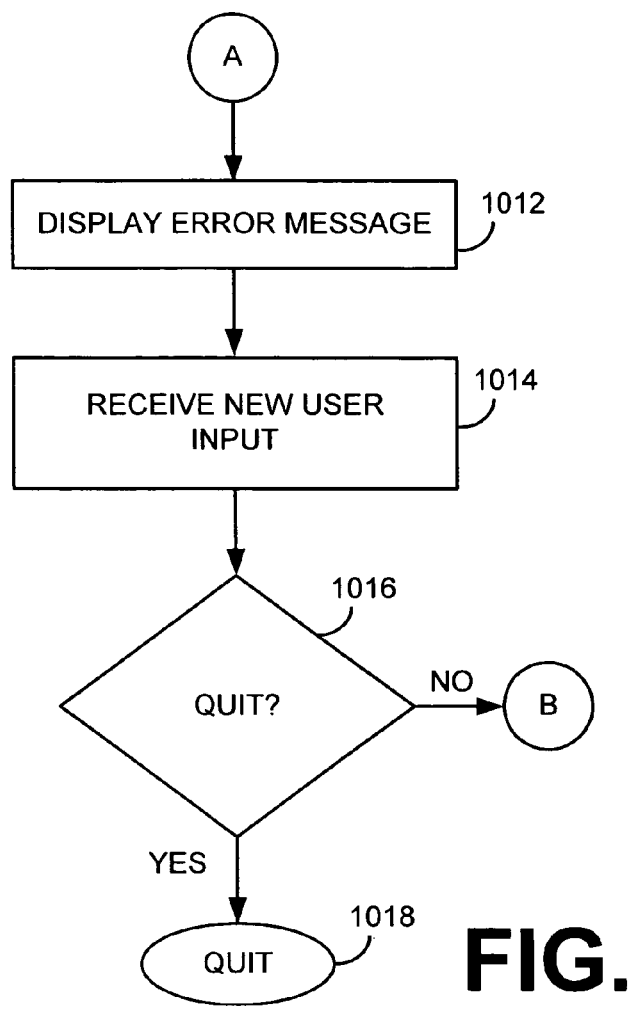

FIGS. 10A and 10B illustrate exemplary steps that are taken while compressing a work of multimedia content. In step 1000, segments of the digital multimedia content are categorized. Typically, the categorization of the segments is done using at least derived content information. Generally, the number of categories ($N_C$) is set to a default value, but, in some embodiments, $N_C$ is a user-defined value. For the sake of clarity, an example in which $N_C=3$ is provided, but this is a non-limiting example and it should be remembered that the default and/or user defined value for $N_C$ can be different from 3. In one embodiment, the categories are hierarchized based upon some classifications. For example, a first category of segments is classified as high value, a second category of segments is classified as middle value, and a third category of segments is classified as low value. Typically, the amount of compression that is applied to each category depends upon its classification, with lower valued classifications getting more temporal compression than higher valued classifications.

In step 1002, the aggregate playback parameter for the video is calculated. In some embodiments, each category of video is associated with a default playback-scaling factor ($\alpha$). For example, in some embodiments, the highest classification of segments have an initial default playback-scaling factor $\alpha=1$ so that the playback rate is the natural playback rate ($v_0$) and the lowest classification of segments have an initialed default playback-scaling factor of 1.5, i.e., the playback rate for segments in the lowest classification is $1.5v_0$. The default playback-scaling factors for other categories between the lowest and highest categories are interpolated. In some embodiments, the playback-scaling factors for some of the different categories are a function of the desired performance duration ($T_D$) and the initial (uncompressed) duration of the video ($T_0$). For example, for the case of $N_C=3$, the initial scaling factors might be $\alpha_1=1.0$, $\alpha_2=1.25$ ($T_D/T_0$) and $\alpha_3=1.5$ ($T_D/T_0$) for the highest classification of segments, middle classification of segments, and lowest classification of segments, respectively. In one embodiment, the calculated playback parameter is a performance duration ($T_C$), which is given by the equation $$T_C = \sum_{i=1}^{N_C} \frac{N_i}{\alpha_i v_o},$$

where $N_i$ is the number of frames in the $i^{th}$ category, and $\alpha_1$ is the playback-scaling factor for the $i^{th}$ category.

As previously mentioned hereinabove, in some embodiments, the desired performance parameter is a desired average playback rate, $\overline{v}_D$. Those skilled in the art would recognize how the exemplary method described hereinabove could be modified such that the actual average playback rate, $\overline{v}_A$, is approximately equal to the desired average playback rate, $\overline{v}_D$. For example, in step 1002, the different categories of segments are provided an initial playback rate ($\alpha v_0$), and the average playback rate is then calculated. The calculated average playback rate, $\overline{v}_C$, is given by $$\overline{v}_C = \sum_{i=1}^{N_C} N_i \alpha_i v_o,$$

where $N_i$ is the number of frames in the $i^{th}$ category, and $\alpha_1$ is the playback scaling factor for the $i^{th}$ category.

In step 1004, a comparison is made between the calculated and desired playback parameter. Generally, there is a tolerance ($\epsilon$) associated with the desired playback parameter. For example, in the case where the desired playback parameter is a desired performance duration ($T_D$), then so long as the calculated performance duration $T_C$ is within range of $T_D-\epsilon$ to $T_D+\epsilon$, then it is approximately equal to $T_D$. In that case, in step 1006, the video content is played back. However, if the value of $T_C$ is not approximately equal to $T_D$, then in step 1008 the playback-scaling factors are checked to see if all of the scaling factors are equal to predetermined maximum values. In some embodiments, different classifications of multimedia content have different maximum scaling factors associated with them. For example, the maximum playback-scaling factor ($\alpha_{MAX}$) associated with the highest classification might be 1.1, and $\alpha_{MAX}$ for the lowest classification might be 2. In another non-limiting example, if the desired performance parameter is a desired average playback rate ($\overline{v}_D$), then in step 1004, the comparison would be between the calculated average playback rate, $\overline{v}_C$, and the desired average playback rate, $\overline{v}_D$. Again, there is an acceptable tolerance ($\epsilon$) between the desired average playback rate, $\overline{v}_D$, and the calculated average playback rate, $\overline{v}_C$.

If the playback-scaling factors are not maximized, then in step 1010, the scaling factors for the categories are adjusted. In one preferred embodiment, the temporal compression module 316 includes logic for selectively adjusting the playback-scaling factors for the different classifications of categories. Preferably, the playback-scaling factors are adjusted so that most or all of the temporal compression is done in the lower valued classifications of categories. However, when necessary, the higher valued classifications of categories can be temporally compressed by raising their playback-scaling factors to be greater than 1.0.

After adjusting one or more of the playback-scaling factors, steps 1002 and 1004 are repeated, and if necessary, step 1008 is repeated. If the condition of step 1008 is met, i.e., the condition is "yes," then the process continues at step 1012 (see FIG. 10B.) Otherwise, the process continues until the condition of step 1004 is met, at which point, the video content is replayed in step 1006.

Referring to FIG. 10B, in step 1012 an error message is displayed to the user. This step is reached when the temporal compression system cannot compress the user-selected video content down to the desired playback parameter, non-limiting examples of which include desired performance duration ($T_D$) and desired average playback rate. The error message may include a menu for inputting new user parameters such as changing the desired playback parameter and/or providing one or more new maximum playback-scaling factors and/or quitting.

In step 1014, the temporal compression system receives the user input, and in step 1016, the automated temporal compression system interprets the user input to determine whether to quit. If the user selected "quit," then in step 1018, the automated temporal compression system quits. Otherwise, the automated temporal compression system returns to step 1010. (See FIG. 10A.)

Figure 11:
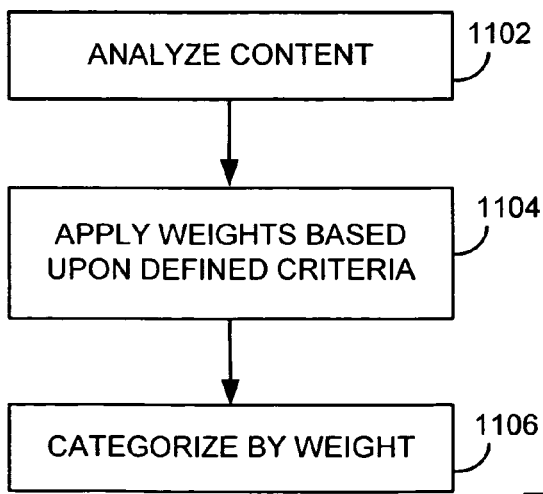
FIG. 11 depicts a method of categorizing segments of a work of multimedia content.

FIG. 11 is a flow chart of exemplary steps that can be implemented as part of step 1000. The segmentizing of step 1000 is done based upon the content in the multimedia content using given criteria. In step 1102, the multimedia analyzer module 312 processes the multimedia content to detect, among other things, commercials, scene changes, slowly moving scene changes, trailers and/or previews, credits, opening and/or closing, etc. The multimedia analyzer module 312 uses various criteria such as, but not limited to, audio characteristics including whether the audio changes states between stereo and mono, magnitude of motion vectors, level of color saturation in the source video, contrast or brightness level of the source video, and other characteristics of the video and audio within the multimedia content. When the multimedia content that is being analyzed is in an MPEG format, the multimedia analyzer module 312 may also characterize the frames based upon whether the frames are I, P, or B frames, which are well known to those skilled in the art. Typically, the information needed for segmentation of a work is included in derived content information. As previously described hereinabove, if a work has embedded derived content information, then the multimedia analyzer module 312 extracts the embedded derived content information from the work and determines whether the derived content information is sufficient for the current processing, e.g., temporal compression. If so, the derived content information is provided to the temporal compression module 316 so that the temporal compression module 316 can segment the work. On the other hand, if the work does not include embedded derived content information, or if the embedded derived content information is insufficient for temporal compression, then the multimedia analyzer module 312 analyzes the content of the work and provides the derived content information to the temporal compression module 316.

In step 1104, segmentation weights are associated with the frames 804 of multimedia content. For example, when the audio for a given frame switches from mono to stereo, the change of audio characteristic might signify the beginning of a commercial, and consequently, that given frame will receive a large segmentation weight. In addition, audio characteristics such as the presence or lack of speech, gun shots, explosions, and mechanical noises can be used to associate segmentation weights. Similarly, a frame that has little motion i.e., a frame with small motion vectors, will receive a higher segmentation weight than a frame with a lot of motion, i.e., a frame with large motion vectors. Relative quantities such as large or small motion vectors can be determined according to the magnitude of the motion vector divided by the magnitude of a reference vector. So, for example, if the magnitude of a given motion vector is twice the magnitude of the reference vector, then the given vector is a large motion vector. But, on the other hand, if the magnitude of the given vector is one-half that of the reference vector, then the given vector is a small vector. Generally, a predicted frame includes more than one motion vector and consequently, the temporal compression module 316 includes logic for calculating a representative motion vector based upon a statistical method. For example, the representative motion vector could be a mean, median, or mode magnitude of the motion vectors in the given frame or the largest magnitude, or the smallest magnitude.

In step 1106, the segmentation weights are used to categorize and hierarchize the frames of multimedia content. For example, all of the frames that have a segmentation weight beneath a predetermined lower threshold are categorized with the highest classification; all of the frames that have a segmentation weight above a predetermined upper threshold are categorized with the lowest classification; and all of the frames that have a segmentation weight between the lower and upper thresholds are categorized with the middle classification. In an alternative embodiment, the frames can be categorized and heirarchized based upon a statistical distribution of segmentation weights. For example, the frames that are included in the category having the highest classification account for 25% of the total number of frames; the frames that are included in the category having the lowest classification account for 25% of the total number of frames; and the frames that are included in the category having the middle classification account for 50% of the total number of frames.

In one preferred embodiment, when frames are identified as being commercials, those frames are automatically dropped, i.e., they are not played back to the user. However, in some alternative embodiments, frames that contain commercials are initially included in the category of segments that has the lowest classification, but the commercial frames are then dropped as needed to make the desired performance parameter approximately equal the actual performance parameter. In some embodiments, frames that contain trailers and/or previews, and credits, opening and/or closing, are also included in the category of segments that has the lowest classification, and frames from that category can be dropped as needed. In addition, in some embodiments, frames that do not include commercials can also be dropped as needed, even frames that are not included in the category having the lowest classification.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method of processing a given work of multimedia content, the method comprising the steps of:

receiving the given work of multimedia content, the given work of multimedia content having derived content information embedded therein, the derived content information includes information for modifying a performance duration of the given work of multimedia content;

receiving a desired performance parameter; and using the derived content information and the desired performance parameter to play the given work of multimedia content in approximate accordance with the desired performance parameter, wherein the desired performance parameter includes at least one of a desired performance duration or a desired average playback rate, and wherein when the work of multimedia content is played, the actual performance duration of the work of multimedia content is approximately equal to the desired performance duration, or the actual average playback rate of the work of multimedia content is approximately equal to the desired average playback rate wherein the step of using the derived content information further includes the step of temporally compressing the performance duration of the work of multimedia content by playing segments of the work of multimedia content at variable playback rates.

2. The method of claim 1, further including the step of:

determining whether the derived content information is sufficient for temporally compressing the performance duration;

responsive to determining the derived content information is not sufficient, analyzing the content of the given work of multimedia content to determine additional derived content information, and wherein the additional derived content information is used in temporally compressing the given work of multimedia content.

3. The method of claim 2, further including the step of:

embedding the additional derived content information into the given work of multimedia content.

4. The method of claim 3, further including the step of:

storing the given work of multimedia content with the additional derived content information embedded therein.

5. The method of claim 1, wherein the step of temporally compressing the performance duration further includes the steps of:

categorizing segments of the given work of multimedia content based at least in part upon the derived content information;

heirarchizing the categorized segments from a first classification to a last classification; and associating a first playback rate (v1) with the first classification of segments and a second playback rate (v2) with the last classification of segments, wherein the second playback rate (v2) is faster than the first playback rate (v1).

6. A program embodied in a non-transitory computer readable medium, the program comprising:

logic configured to receive a given work of multimedia content having derived content information embedded therein, wherein the derived content information includes information for modifying a performance duration of the given work of multimedia content;

logic configured to receive a desired performance parameter; and logic configured to use the derived content information and the desired performance parameter to play the given work of multimedia content in approximate accordance with the desired performance parameter, wherein the desired performance parameter includes at least one of a desired performance duration or a desired average playback rate, and wherein when the work of multimedia content is played, the actual performance duration of the work of multimedia content is approximately equal to the desired performance duration, or the actual average playback rate of the work of multimedia content is approximately equal to the desired average playback rate, wherein the step of using the derived content information further includes the step of temporally compressing the performance duration of the work of multimedia content by playing segments of the work of multimedia content at variable playback rates.

7. The program of claim 6, further including:

logic configured to determine whether the derived content information is sufficient for temporally compressing the performance duration;

logic configured to analyze the content of the given work of multimedia content to determine additional derived content information, wherein the additional derived content information is used in temporally compressing the given work of multimedia content.

8. The program of claim 7, further including:

logic configured to embed the additional derived content information into the given work of multimedia content.

9. The program of claim 8, further including:

logic configured to store the given work of multimedia content with the additional derived content information embedded therein.

10. The program of claim 6, wherein the logic configured to temporally compress the performance duration further includes:

logic configured to categorize segments of the given work of multimedia content based at least in part upon the derived content information;

logic configured to heirarchize the categorized segments from a first classification to a last classification; and logic configured to associate a first playback rate (v1) with the first classification of segments and a second playback rate (v2) with the last classification of segments, wherein the second playback rate (v2) is faster than the first playback rate (v1).

11. The program of claim 10, further including:

logic configured to associate a third playback rate (v3) with a third classification of segments, the third classification interposing the first and last hierarchized classifications and the third playback rate (v3) being less than the second playback rate (v2).

* * * * *